(12) United States Patent
Fertner et al.

(10) Patent No.: US 8,781,078 B2
(45) Date of Patent: Jul. 15, 2014

(54) METHOD FOR ESTIMATING TRANSMISSION PROPERTIES OF A TELECOMMUNICATIONS TRANSMISSION LINE

(75) Inventors: Antoni Fertner, Stockholm (SE); Per Ola Börjesson, Lund (SE); Daniel Cederholm, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 65 days.

(21) Appl. No.: 13/394,392

(22) PCT Filed: Sep. 11, 2009

(86) PCT No.: PCT/SE2009/051016
§ 371 (c)(1),
(2), (4) Date: Mar. 6, 2012

(87) PCT Pub. No.: WO2011/031199
PCT Pub. Date: Mar. 17, 2011

(65) Prior Publication Data
US 2012/0163559 A1 Jun. 28, 2012

(51) Int. Cl.
*H04M 1/24* (2006.01)
(52) U.S. Cl.
USPC ............. 379/24; 379/243; 379/394; 379/414
(58) Field of Classification Search
USPC .......... 379/24, 30, 1.01, 1.04, 23, 27.01, 394, 379/398, 243, 414
See application file for complete search history.

(56) References Cited

FOREIGN PATENT DOCUMENTS

| FR | 2586818 A1 | 3/1987 |
|---|---|---|
| WO | 2007050001 A1 | 5/2007 |
| WO | 2009131501 A1 | 10/2009 |

OTHER PUBLICATIONS

Brusset, H. et al. "On the Convergence of Standard and Damped Least Squares Method ." Abstract Only, Journal of Computational Physics, vol. 22, No. 4, Dec. 1976.
Farhang, J. "Process Simulation using Continuation Method in Complex Domain." Computers & Chemical Engineering, vol. 22, Suppl. 1, Mar. 15, 1998.
Hasar, U. C. "A Microwave Method for Noniterative Constitutive Parameters Determination of Thin Low-Loss or Lossy Materials." IEEE Transactions on Microwave Theory and Techniques, vol. 57, No. 6, Jun. 2009.

(Continued)

*Primary Examiner* — Duc Nguyen
*Assistant Examiner* — Yosef K Laekemariam
(74) *Attorney, Agent, or Firm* — Murphy, Bilak & Homiller, PLLC

(57) ABSTRACT

Transmission properties of a telecommunications transmission line may be estimated with improved accuracy by numerical solution for $\Gamma$ of $Z_{in}\cdot j\omega^{\wedge}C=\Gamma\coth(\Gamma)$. At least one curve is adapted to $\Gamma$ solutions already obtained and a starting point for numerical solution is selected in dependence of the at least one curve and in dependence of an already obtained solution close in frequency. In a first frequency range, starting points for numerical solution may be calculated from a biquadratic equation. In a second frequency range, a line in the complex plane may be adapted to solutions already obtained and new starting points selected in dependence of the line and in dependence of the previous solution. In a third frequency range, two lines in the frequency plane may be adapted to solutions already obtained and new starting points selected in dependence of the lines.

14 Claims, 12 Drawing Sheets

(56) References Cited

OTHER PUBLICATIONS

Wayburn, T. L. et al. "Homotopy Continuation Methods for Computer-Aided Process Design." Computers & Chemical Engineering, vol. 11, No. 1, pp. 7-25, 1987.

Zhao, C. et al. "Data-Reduction Method for Simultaneous Measurement of Permittivity and Permeability with a Short-Circuited Transmission Line." The Ninth International Conference on Electronic Measurement & Instruments (ICEMI'2009), Beijing, China, Aug. 16-19, 2009.

METHOD FOR ESTIMATING TRANSMISSION PROPERTIES OF A TELECOMMUNICATIONS TRANSMISSION LINE

TECHNICAL FIELD OF THE INVENTION

The present invention relates to the field of transmission line analysis.

BACKGROUND

In patent application WO2005SE01619 (publication number WO2007050001) a method is described wherein line constants of a telecommunications transmission line are estimated using estimates of the line input impedance $Z_{in}$ at a number of angular frequencies ω as input values. Values of $Z_{in}$ for at least two angular frequencies ω are required in order to estimate the line constants $\hat{R}$ (line resistance), $\hat{L}$ (line inductance) and $\hat{C}$ (line capacitance). (line conductance $\hat{G}$ neglected)

$Z_{in}$ is expressed as a polynomial in jω with the line constants as coefficients. This relationship is solved for the line constants by means of two systems of equations, where in each system there is one equation per spectral component of $Z_{in}$, i.e. at least two equations per system.

Only spectral components of $Z_{in}$ for which the propagation constant of the line times the line length is less than π ($|\gamma d|<\pi$ or $|\Gamma|<\pi$) can be used.

The estimates so obtained suffer from some inaccuracy, in particular the inductance estimate has an accuracy of about 30%.

The disclosure suggests that better accuracy can be achieved by using more frequencies, i.e. measuring $Z_{in}$ at more frequencies and using these values as input.

In GB 2180073 A (corresponding to FR 2586818 A), a method for detecting wear in underwater cables is disclosed. The primary parameters of the cable are measured before deployment of the cable and, using the propagation constant (calculated from the measured primary parameters) as an intermediate value, an input impedance $Z_a$ of the line in good condition is determined.

When the apparent impedance $Z_a$ changes, a model is applied in which a position and impedance of a fault are varied until the $Z_a$ calculated according to the model matches the measured $Z_a$, and hence the fault position and impedance used as input for the model correspond to the position and impedance of the actual fault or wear point.

U.S. Pat. No. 4,313,169 discloses a system for detecting the position of a fault in an electrical power line. Current and voltage measurements, along with the propagation constant and characteristic impedance of the line are used to estimate the location of a fault. The propagation constant and characteristic impedance are assumed to be known a priori. It is assumed that both the resistance and the conductance per unit length are negligible.

SUMMARY OF THE INVENTION

The invention aims to provide estimates of properties of telecommunications transmission lines in a different way and with better accuracy than the prior art, in particular for DSL capacity estimates, using single-ended line testing (SELT).

The DSL transmission capacity that may be achieved over a transmission line depends on the line attenuation at the DSL frequencies, which in turn is dependent on inter alia the line inductance.

Hence, an inaccurate inductance estimate makes it difficult to predict the achievable transmission capacity for a customer interested in subscribing to DSL service.

WO2005SE01619 provides an inductance estimate of some 30% accuracy, and suggests that accuracy increases with the number of frequencies used and hence the number of equations in the solution. However, according to the present invention, better accuracy can be obtained by doing more or less the opposite.

Using a priori knowledge of $\hat{C}$ (which may be obtained by the methods of WO2005SE01619 or by other methods), and then solving numerically for Γ the relationship $Z_{in}\cdot j\omega\hat{C}=\Gamma\coth(\Gamma)$ separately for each angular frequency ω, a solution can be generated independently for each angular frequency ω using one equation and one Z value. Γ is the propagation constant times the line length, sometimes called the "electrical length" of the line.

This provides a drastic accuracy improvement; $\hat{R}$ and $\hat{L}$ estimates may be up to some 100 times more accurate than those made by the method of WO2005SE01619. Further, by a suitable selection of starting point for the numerical solution, the present invention may be applied also to combinations of line lengths and frequencies for which $|\Gamma|>\pi$. (e.g. long lines and/or high frequencies)

The values of $\hat{R}$ and $\hat{L}$ vary with frequency, and this effect is especially noticeable at higher frequencies. Because of its restriction that $|\Gamma|<\pi$, WO2005SE01619 provides $\hat{R}$ and $\hat{L}$ values which are valid for lower frequencies. $\hat{R}$ and $\hat{L}$ values for lower frequencies (obtained with WO2005SE01619 or otherwise) may be extrapolated to higher frequencies by use of a cable model, but the present invention provides better accuracy than that which is achieved by such extrapolation, also in the case where the $\hat{R}$ and $\hat{L}$ estimates are accurate for the lower frequencies.

In a further aspect, and some more in detail, a method according to the present invention works as follows.

A Γ solution set is generated by obtaining Γ estimates for a number of angular frequencies ω. A curve is adapted to the Γ solution set. A numerical solution for Γ of $Z_{in}\cdot j\omega\hat{C}=\Gamma\coth(\Gamma)$ for a further angular frequency ω is generated and added to the solution set. The starting point for the numerical solution is chosen in dependence of the curve and in dependence of a Γ solution which is close in angular frequency to the further angular frequency. The curve is again adapted to the Γ solution set (thus now including also the solution for the further angular frequency), a new numerical solution is generated for still a further ω and so on.

The invention provides the advantages of good accuracy and computational efficiency without the need for double-ended line testing. In particular, it provides good Γ estimates also when $|\Gamma|>\pi$, i.e. for high frequencies such as those used for DSL and/or for long lines.

DETAILED DESCRIPTION OF EMBODIMENTS

Figure 1:
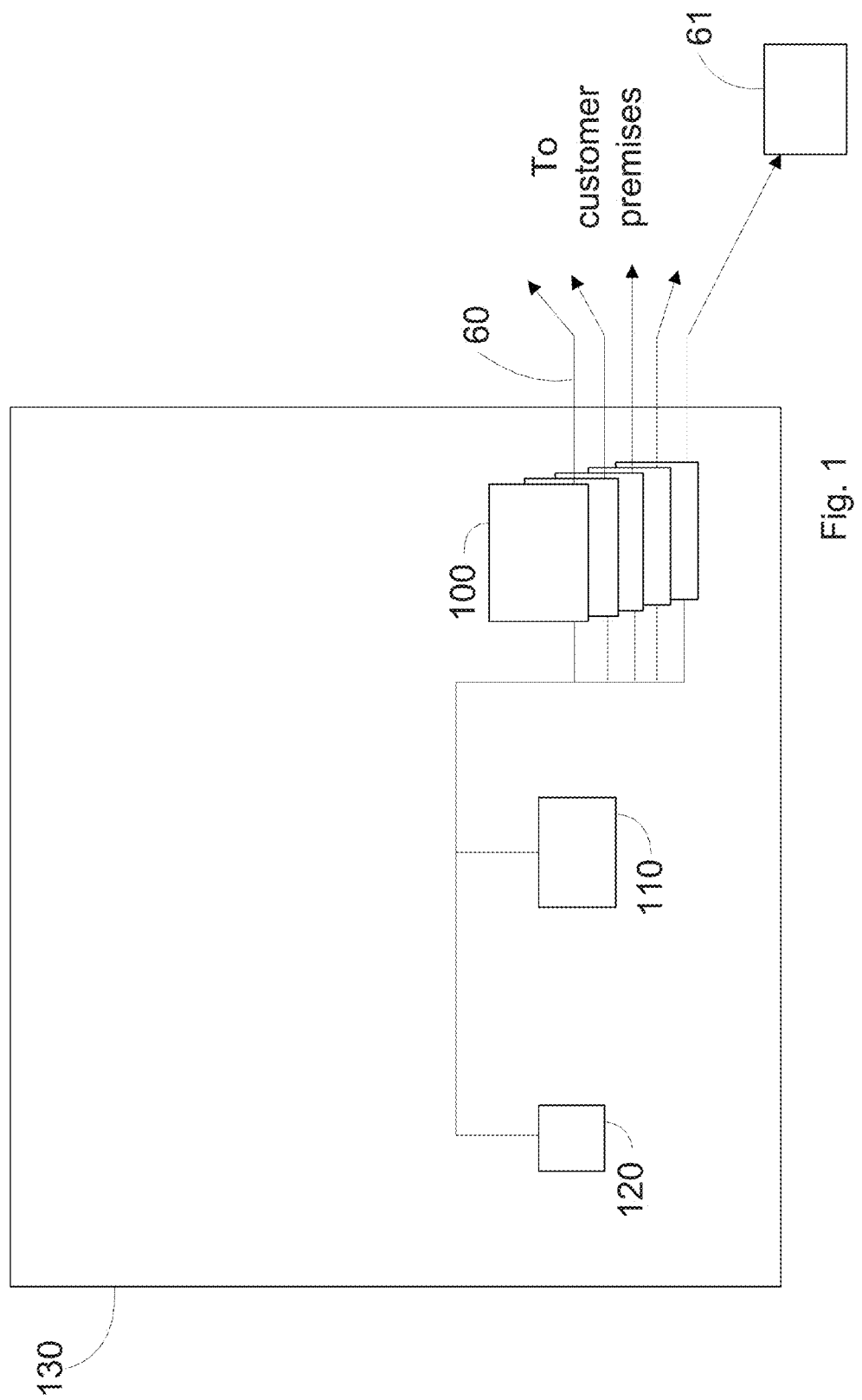
FIG. 1 shows a block schematic of a central office setting where the invention may be employed.

In this text, the term "frequency" refers to angular frequency, unless it is clear from the unit of measurement given with it that it refers to frequency in the normal sense. E.g "the frequency $\omega$ refers to angular frequency, whereas e.g. "frequencies up to 30 MHz" refers to frequency in the normal sense.

In WO2005SE01619, values of the line input impedance $Z_{in}$ at a plurality of angular frequencies $\omega$ are used to create a system of equations which is solved for the line constants $\hat{R}$, $\hat{L}$ and $\hat{C}$.

$Z_{in}$ is expressed as a polynomial in $j\omega$ with the line constants as coefficients. This relationship is solved for the line constants by means of two systems of equations, one for the real part and one for the imaginary part. In each system there is one equation per spectral component of $Z_{in}$, i.e. at least two equations per system. From $\hat{R}$, $\hat{L}$ and $\hat{C}$, $\Gamma$ may be determined. $\Gamma$ is the propagation constant times the line length, sometimes called the "electrical length" of the line. The disclosure suggests that better accuracy generally can be achieved by using values of $Z_{in}$ for more angular frequencies $\omega$, which thus also means a system of more equations.

However, according to the present invention, better accuracy may be achieved by using only one equation and solving for $\Gamma$ instead of the line constants, making possible an independent solution for $\Gamma$ for each angular frequency $\omega$.

Neglecting line conductance $\hat{G}$, the propagation constant times the line length may be expressed as $\Gamma = Z_0 \cdot j\omega \cdot \hat{C}$. Since input impedance for the open-ended line can be expressed as $Z_{in}=Z_0 \coth(\Gamma)$, then by suitable manipulation one can obtain $Z_{in} \cdot j\omega \hat{C} = \Gamma \coth(\Gamma)$. If $\hat{C}$ is known a priori, the relationship $Z_{in} \cdot j\omega \hat{C} = \Gamma \coth(\Gamma)$ can then be solved for $\Gamma$ independently for each angular frequency $\omega$. $\hat{C}$ and $Z_{in}$ may be determined by the methods of WO2005SE01619 and the documents it refers to or by other available methods.

$Z_{in} \cdot j\omega \hat{C} = \Gamma \coth(\Gamma)$ is preferably solved numerically. Numerical solution can be difficult due to false minima. For telecommunications transmission lines, this is particularly so for higher frequencies, especially when the line consists of multiple segments made up of different types of cable and/or in the presence of excessive noise. The choice of starting point for the numerical solution can be critical. An existing solution point close in frequency appears prima facie as a good choice for a starting point, but this has shown to have problems. Neither does a simple extrapolation from close solutions work well.

Instead, a set of $\Gamma$ solutions is generated for a frequency range where false solutions are easily avoided. Then, a curve which is preferably a line can be adapted in a first way to the solutions so that noise and fluctuations in $\Gamma$ do not cause problems. The line is then used to select a starting point for the solution for a next $\omega$. As new solutions are made, the line is further adapted, new starting points are generated, etc. For a still higher frequency, the first way of line adaption does not work well, but a second way of adaption does. In this way, estimates of $\Gamma$ for the whole of a desired frequency range, typically the frequency range used for DSL transmission, are generated. This is explained in further detail below.

Biquadratic Solution $Z_{in} \cdot j\omega \hat{C} = \Gamma \coth(\Gamma)$ may be solved for $\Gamma$ analytically by means of a biquadratic equation.

By equating $\Gamma \coth(\Gamma)$ with a truncated Taylor series, one can derive the formula $$Z_m \cdot j\omega \cdot \hat{C} = 1 + \frac{\Gamma^2}{3} - \frac{\Gamma^4}{45}$$

This has the form of a quadratic function of a square. The formula $$\Gamma^2 = \frac{-\frac{1}{3} \pm \sqrt{\left(\frac{1}{3}\right)^2 - 4 \cdot \left(-\frac{1}{45}\right) \cdot (1 - Z_m \cdot j\omega \cdot \hat{C})}}{2 \cdot \left(-\frac{1}{45}\right)}$$

may be used to provide a value for $\Gamma^2$, the correct root being the one with negative real part and positive imaginary part. $\Gamma$ may then be determined by taking the square root of $\Gamma^2$ and selecting the root with positive real part and positive imaginary part.

The formula is valid for $|\Gamma|<\pi$.

Numerical Solution $Z_{in} \cdot j\omega \hat{C} = \Gamma \coth(\Gamma)$ may be solved numerically for $\Gamma$.

Numerous methods for numerical solution of nonlinear equations are known. Here, a preferred method consists of the combination of two standard procedures: the classic Newton-Raphson method (possibly Secant) and the Least Mean Square (LMS) algorithm. The recursive formula is expressed as:

$$\Gamma_k(i+1) = \Gamma_k(i) + \mu \cdot \frac{\Gamma_{in}(\omega_k) \cdot \tanh(\Gamma_k(i)) - \Gamma_1(i)}{\Gamma_{in}(\omega_k) \cdot \tanh(\Gamma_k(i))^2 - \Gamma_{in} + 1}$$

$$\Gamma_k(i+1) = \\ \Gamma_k(i) + \mu \cdot \frac{[\Gamma_{in}(\omega_k) \cdot \tanh(\Gamma_k(i)) - \Gamma_k(i)] * [\Gamma_k(i) - \Gamma_k(i-1)]}{\Gamma_{in}(\omega_k) \cdot [\tanh(\Gamma_k(i)) - \tanh(\Gamma_k(i-1))] - [\Gamma_k(i) - \Gamma_k(i-1)]}$$

or where $\Gamma_{in}(\omega_k) = Z_{in}(\omega_k) \cdot j\omega_k \cdot \hat{C}$, is consecutive iteration, $\omega_k$ is actual angular frequency and $\mu$ is a constant regulating the convergence rate. The first formula corresponds to the Newton-Raphson method combined with the LMS algorithm while the second corresponds to the secant method combined with the LMS algorithm.

The solving procedure works as follows:

To avoid algorithm failure due to "long steps", the Newton-Raphson (Secant) method is combined with the LMS algorithm. In a first stage just after determining the "initial estimate" (starting point), the update procedure is modified by bringing in a constant, $\mu$, regulating convergence rate. Similarly as in the LMS algorithm one has to compromise between fast but possibly unstable convergence and slow but safe convergence. For this algorithm experience has shown that a $\mu$ of 0.05-0.2 is a good trade off. However, in the presence of noise it may have to be set to much lower values.

The first stage continues for a number of iterations. The number of iterations can be suitably fixed to guarantee good accuracy for the chosen $\mu$. Otherwise it is also possible to formulate and apply stop criteria with a flexible number of iterations to guarantee convergence. Anyhow, the choice of number of iterations is not critical, even though it is important that the process does not continue too long considering the possibility of unwanted oscillations.

At a second, last stage, the classic Newton-Raphson method (i.e. $\mu=1$) is used to achieve fast convergence to the optimal solution. In practice, two to three updates using this method guarantee a close-to-optimal solution.

Many other possible methods of solution which are numerical in a broad sense exist, for example exhaustive search or other brute force methods, statistical methods such as Gaussian adaption, or diverse optimization methods such as stochastic optimization, genetic algorithms, etc.

Starting Point, Low Frequencies

The starting point ("initial estimate) for the numerical solution for each angular frequency $\omega_k$ is for low frequencies preferably generated by the biquadratic solution described above. This works well for frequencies such that $|\Gamma|<\pi$.

It is also possible to use the solution for a previous frequency $\omega_{k-1}$ as the starting point, whereby the very first starting point may be generated by the biquadratic solution or a fixed predetermined value may be used.

Starting Point, Higher Frequencies—Complex Plane Line Adaption

Figure 6:
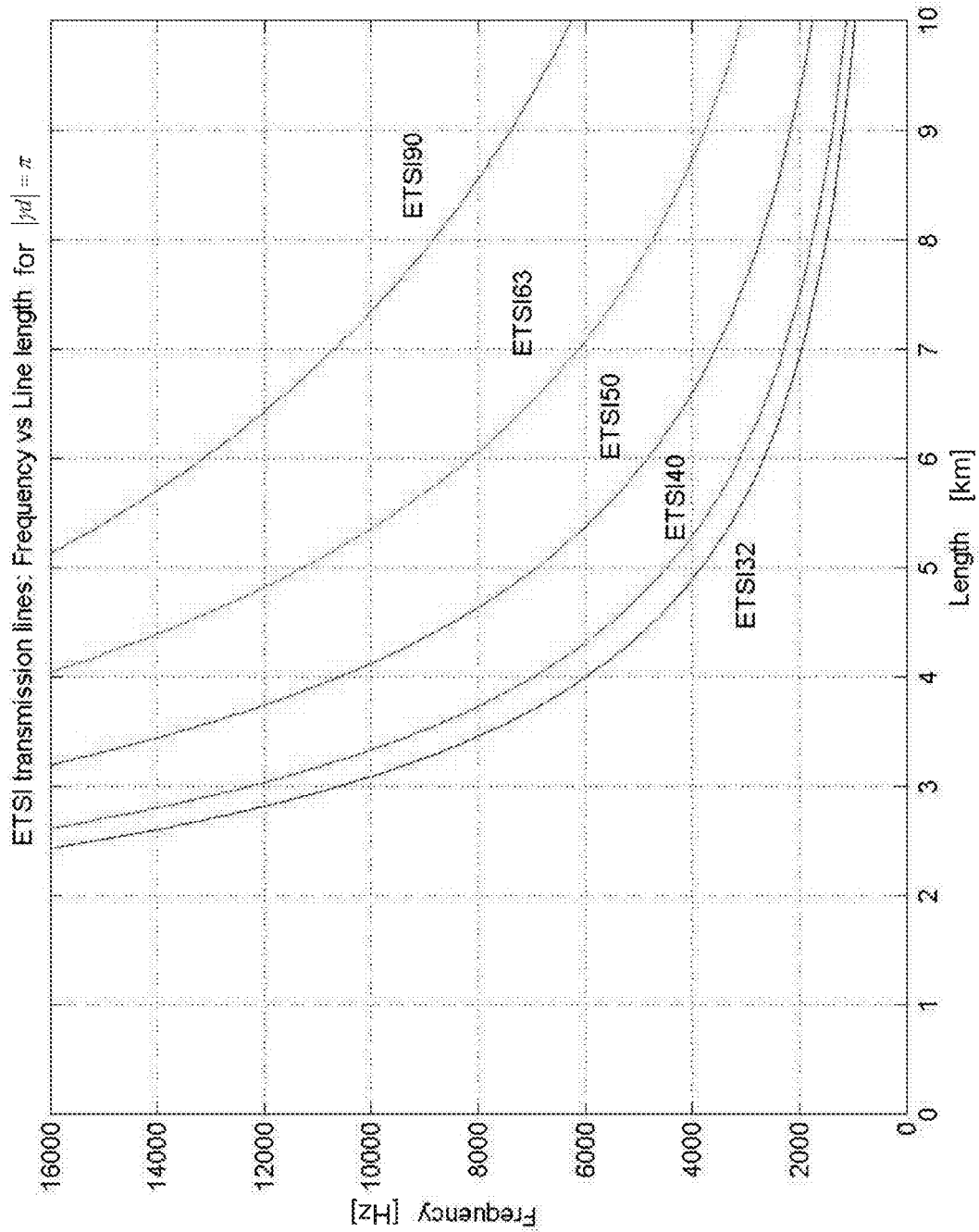
FIG. 6 shows a diagram of frequency as a function of cable length for the condition that the absolute value of the propagation constant times line length equals $\pi$ ($|\Gamma|=\pi$) for various ETSI cable types.

The biquadratic solution above is not valid for $|\Gamma|>\pi$ and so is not suitable for higher frequencies. FIG. 6 shows plots of $|\Gamma|=\pi$ vs frequency for some ETSI cable types. $|\Gamma|<\pi$ is fulfilled in the area to the left and below the curves.

Hence, the longer the line, the lower is the highest frequency that can be used with the biquadratic solution.

The numerical solution may also have reliability problems at higher frequencies. With higher frequency, the numerical solution sometimes converges to false minima which do not represent the correct solution. Using the solution for the previous frequency as starting point for the solution for the next frequency is often not sufficient to avoid the false minima. Once a false solution has been obtained and assumed to be true, using that false solution as starting point for the next solution usually leads to yet another false solution, i.e. the algorithm looses track of the correct $\Gamma$ and is unable to find it again.

However, if the starting point is carefully selected as explained below, false minima may be avoided for the entire DSL frequency band and thus a numerical solution can provide good $\Gamma$ estimates for an extended frequency range.

A better starting point than the solution for the previous frequency can be selected by adapting a curve to solutions already obtained and selecting the starting point in dependence of the curve and in dependence of a solution for a nearby frequency, such as the solution for the previous frequency.

In particular, a preferred choice of curve is a line which is adapted to the solutions using not the standard least squares method, but instead the unusual and much more complex method of least squares adaption with perpendicular offsets. Preferably the line is adapted to most or all of the obtained $\Gamma$ solutions.

The general method of least squares adaption with perpendicular offsets is described in e.g. D. Sardelis and T. Valahas, "Least Squares Fitting-Perpendicular Offsets", American College of Greece, 2009. An internet reference can be found at
http://mathworld.wolfram.com/LeastSquaresFittingPerpendicularOffsets.html The starting point is preferably selected as a point in the complex plane lying between the line and the solution for the nearby frequency, i.e. a point which lies on a line segment from the solution to the line. The nearby frequency is preferably the previous frequency when solving for successively higher frequencies.

Preferably the line segment is a horizontal line segment in the complex plane (i.e. with constant imaginary part) and the new starting point is chosen to be the center of the line segment. In other words, the new starting point has the same imaginary part as the solution for the nearby frequency, and a real part which is the average of the real part of the solution for the nearby frequency and the real part of a point on the line which has the same imaginary part as the solution for the nearby frequency.

The line used for the choice of starting point described above is hence not a mere extrapolation from the most recent $\Gamma$ solutions, but rather a line which avoids oscillations with frequency that may be present in the $\Gamma$ solutions, and instead sets out a more or less average $\Gamma$ trajectory in the complex plane. The choice of line adaption together with the selection of starting point in dependence of the line and the solution for the previous frequency puts the starting point in an area of the complex plane which appears to be more safe from false minima for $Z_{in}\cdot j\omega\hat{C}=\Gamma\coth(\Gamma)$.

Figure 7:
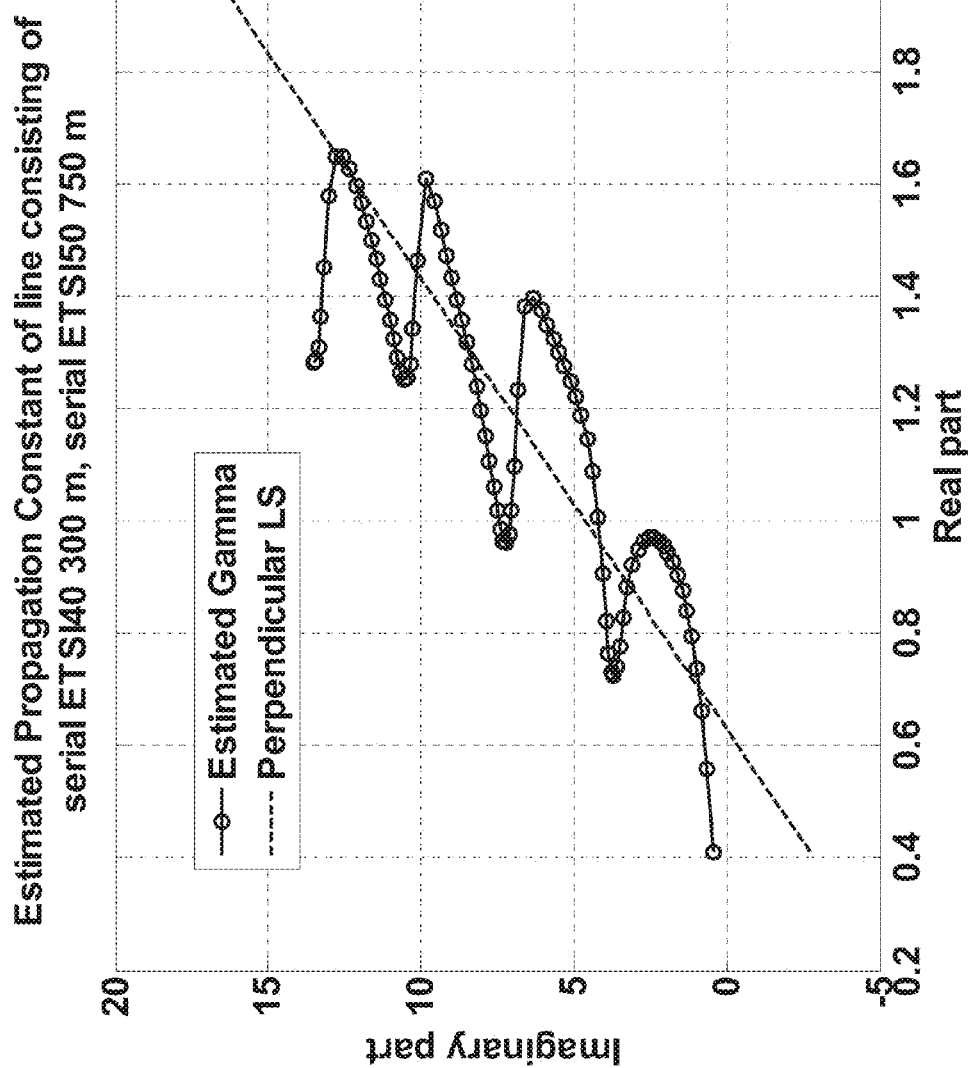
FIG. 7 shows in the complex plane a plot of estimates of $\Gamma$ for a number of frequencies and a line adapted to the $\Gamma$ estimates.

A plot of $\Gamma$ in the complex plane for a frequency range and a line adapted with least squares using perpendicular offsets is shown in FIG. 7.

Starting Point, Still Higher Frequencies—Frequency Plane Line Adaption

For yet higher frequencies, also the above choice of starting point may cause the numerical solution to run into false minima. However, for these higher frequencies, a line in the frequency plane may be used to select the starting point. A first line in the frequency plane is adapted to the real part of solutions already obtained (i.e. with angular frequency $\omega$ on the abscissa and the real part on the ordinate). Likewise, a second line in the frequency plane is adapted to the imaginary part. Standard least squares adaption may be used, but least squares with perpendicular offsets is preferred.

The real and imaginary parts of the starting point for numerical solution are selected as the ordinate of the first and second lines for the angular frequency $\omega$ for which numerical solution is to be made.

Since the lines are adapted to the solutions already obtained, the starting point is explicitly selected in dependence of each of the lines, but also implicitly in dependence of a solution for a nearby frequency, since that solution affects the properties of the adapted lines.

As with the complex plane line adaption above, the frequency plane line adaption avoids oscillations with frequency that may be present in the $\Gamma$ solutions, and instead sets out a more or less average $\Gamma$ trajectory, but now in the frequency plane. The choice of line adaption together with the selection of starting point puts the starting point in an area of the complex plane which appears to be more safe from false minima for $Z_{in} \cdot j\omega \hat{C} = \Gamma \coth(\Gamma)$.

Figure 8:
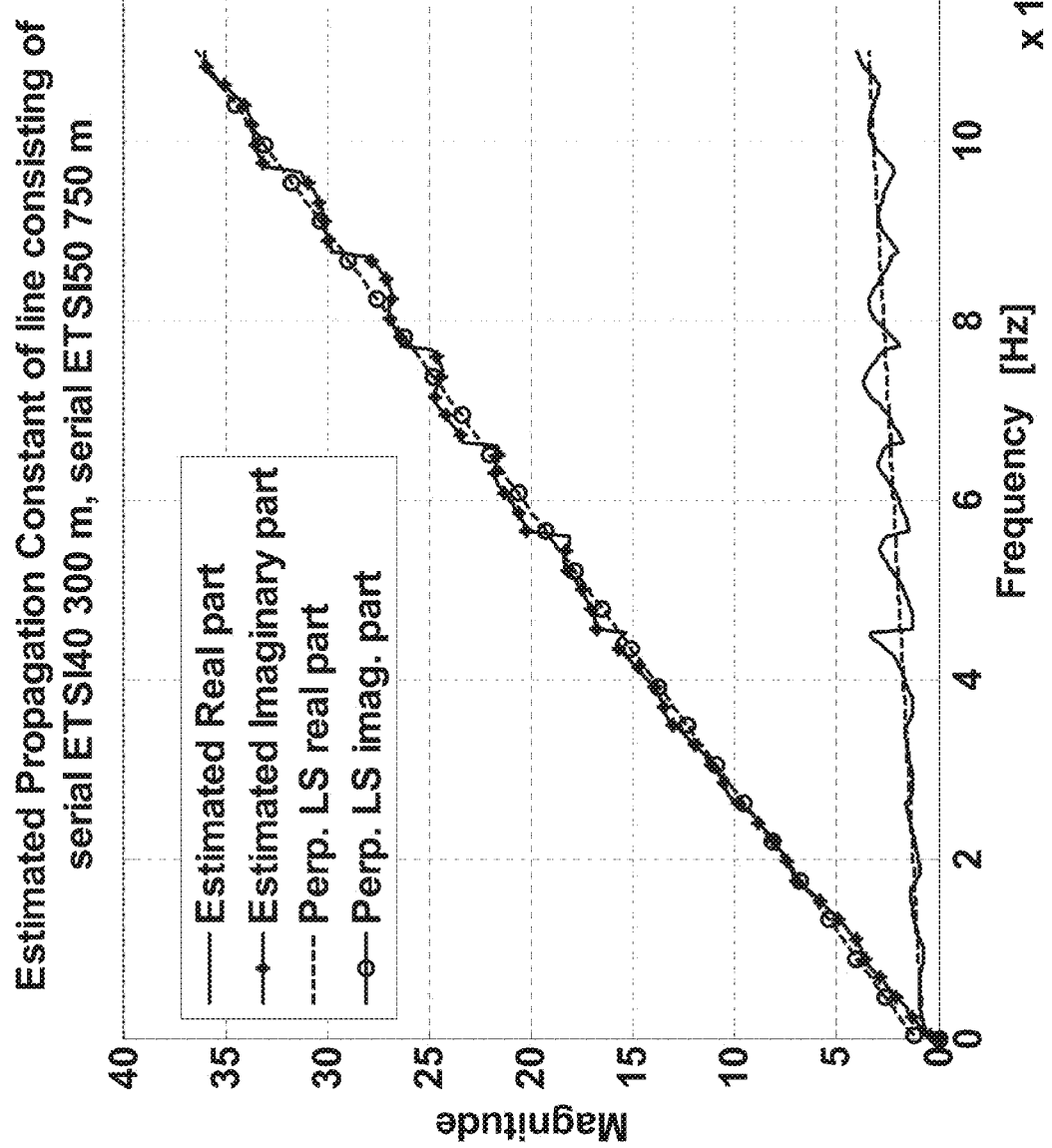
FIG. 8 shows plots of the real and imaginary parts of estimates of $\Gamma$ as a function of frequency (i.e. in the frequency plane) and lines adapted to those real and imaginary parts.

A plot of Im(Γ) and Re(Γ) and the corresponding adapted lines in the frequency plane is shown in FIG. 8.

The frequency where the frequency plane line adaption method is needed instead of the complex plane line adapation method depends on properties of the transmission line, and hence varies between lines. Criteria for when to stop using the complex plane adaption and switch to the frequency plane adaption are given below Covering the Entire DSL Frequency Range The methods above are preferably combined in sequence to cover a wide range of frequencies, for example so that Γ may be estimated for all frequencies used for a particular kind of DSL transmission.

First, estimates of $Z_{in}$ for a first set of angular frequencies in the range of interest are obtained, as well as an estimate of the capacitance, $\hat{C}$ of the line. This may be made by way of the methods described in WO2005SE01619 or the documents it refers to, or with other methods.

Then, in a first phase a Γ solution set is created by obtaining estimates of Γ for a subset of the first set of angular frequencies. This is preferably made by numerical solution using starting points generated by the biquadratic solution, as described above. Estimates normally start at the lowest ω and proceed with successively higher frequencies.

When, with increasing frequency, Γ approaches π, the method changes to the second phase, wherein starting points are generated by the complex plane line adaption method.

The switch may take place such that when a Γ solution for which |Γ|>π is generated, that solution is discarded, the starting point generating method is changed, and solution continues from the ω for which the solution was discarded.

In the second phase, a line in the complex plane is adapted to the set of Γ solutions using perpendicular least squares adaption and a starting point for the next frequency is chosen to have the same imaginary part as the solution for the previous frequency and a real part which is the average of the real part of the solution for the previous frequency and the real part of a point on the line which has the same imaginary part as the solution for the previous frequency.

The new solution is added to the solution set, the line is again adapted to the solutions of the solutions set (now including the new solution), a new starting point is selected and a solution for the next frequency is generated. The process of adaption of the line, selection of starting point and solving for the next frequency is repeated for successively higher frequencies.

As the process is repeated, a running variance of the perpendicular distance from the solution point to the line in the complex plane is calculated as the frequency is increased, e.g.

$$\sigma_k^2 = \frac{1}{k}\sum_{\omega=0}^{\omega_k} D_k^2 = \frac{k-1}{k} \cdot \sigma_{k-1}^2 + \frac{1}{k-1}D_k^2$$

where $D_k$, is the perpendicular deviation of the solution from the adapted line at the frequency $\omega_k$. In a variant, the variance is not calculated all the way from the lowest ω, but for a window, e.g. for the K most recent ω, where K is a predetermined number. A variety of running variance algorithms may be employed as e.g. presented in D. Knuth "Art of Computer Programming", vol. 2. pp 232.

When the variance exceeds a predefined threshold, this may be taken as an indication that the solutions now correspond to false minima, or may soon do so.

However, a preferred method is to relate the perpendicular deviation $D_k$ for the current frequency $\omega_k$ to the square root of the variance (i.e. to the standard deviation), e.g.

$$A_k = \frac{D_k}{\sqrt{\frac{1}{k}\sum_{\omega=0}^{\omega_k} D_k^2}}$$

where a threshold for $A_k$ is chosen to correspond to a selected confidence interval (assuming a Gaussian distribution, which is fundamentally wrong in this case but it works well anyway).

When the absolute value of $A_k$ exceeds the predefined threshold, this is taken as an indication of a false solution.

In an implementation a threshold of 2,32635 was used for $|A_k|$, corresponding to a range within which 98% of the deviations are expected to fall, had they had a Gaussian distribution.

The particular way to detect that the Γ solutions are varying too much is not critical, many different ways can be used successfully.

When a false solution has been detected, a small number of previous solutions may be discarded, for example solutions for frequencies falling into a predetermined bandwidth downwards from the frequency of the solution that exceeded the threshold. It is also possible to discard only the solution which exceeded the threshold, or to discard that solution and a fixed number of solutions for frequencies below, or to discard solutions until a lower threshold is not exceeded.

In an implementation, a lower threshold corresponding to a range within which 95% of deviations are expected to fall was used.

Solution then continues using the frequency plane line adaption method, phase three, from the lowest ω for which a solution was discarded.

Two lines in the frequency plane are adapted to the real part and imaginary part respectively of the Γ solutions generated so far. The real and imaginary parts of the starting point for each new frequency ω are selected as the ordinate values of the lines for that frequency. For each new solution, the lines are again adapted, and the process is repeated until solutions for all desired frequencies have been generated.

The method has been named ROMA, Recursive Obliquely Moving Approximation.

Explanation of FIGS. 2-5

Prior to using values of $\hat{C}$ and $Z_{in}$ as input values for solutions, estimates of these must of course be obtained. However, in the FIGS. 2-5, the obtaining of estimates of $\hat{C}$ and $Z_{in}$ have been omitted for the sake of clarity.

Figure 2:
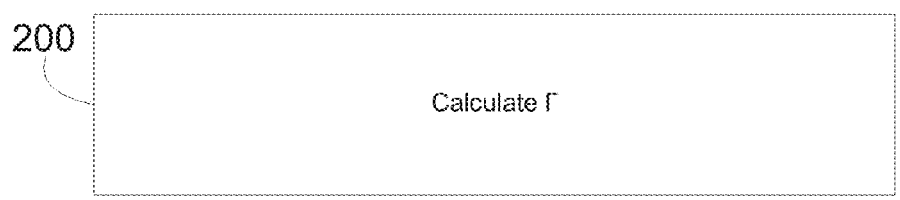
FIG. 2 shows a flow chart of a method wherein Γ is determined using a biquadratic equation.

FIG. 2 shows how Γ may be determined using the biquadratic method.

In the step 200, Γ is calculated as $$\Gamma^2 = \frac{-\frac{1}{3} \pm \sqrt{\left(\frac{1}{3}\right)^2 - 4 \cdot \left(-\frac{1}{45}\right) \cdot (1 - Z_m \cdot j\omega \cdot \hat{C})}}{2 \cdot \left(-\frac{1}{45}\right)}.$$

The formula is valid for |Γ|<π.

Figure 3:
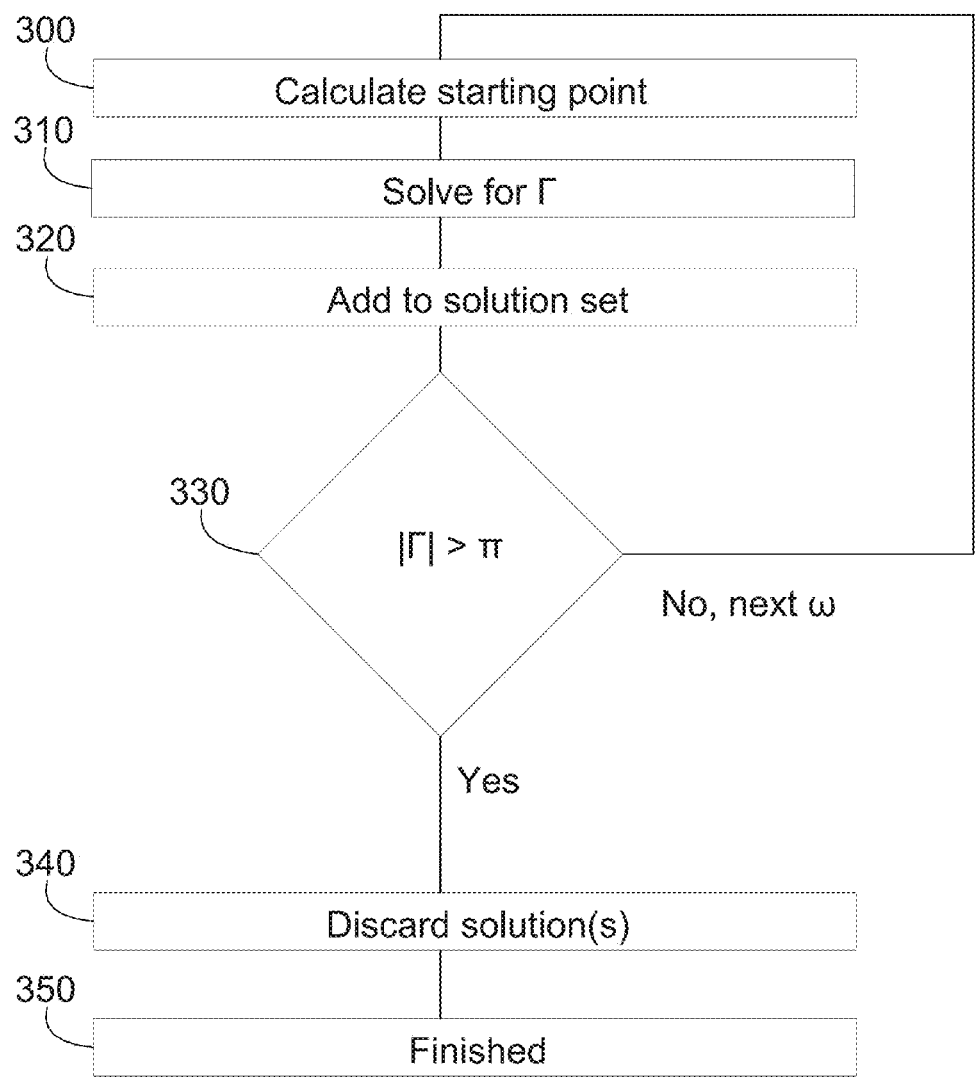
FIG. 3 shows a flow chart of a method wherein Γ is determined numerically in a frequency range where $|\Gamma|<\pi$.

FIG. 3 shows how Γ may be determined for a frequency range for which Γ is less than π using numerical solution with starting points generated with the biquadratic method.

For a frequency range of interest a set of ω values for which Γ is to be estimated is selected. Calculations are made for a current ω which starts as the lowest ω value and proceeds to successively higher ω values. If the method is to be combined with the methods of FIGS. 4 and 5, the set of ω values may cover the entire frequency range that is to be covered by the methods.

In a step 300, a starting point for the current ω is calculated. This may be by use of the biquadratic method as set out in FIG. 2.

In a step 310 $Z_{in} \cdot j\omega \hat{C} = \Gamma \coth(\Gamma)$ is solved numerically using the calculated starting point.

In a step 320 the so obtained solution is added to a Γ solution set.

In a step 330, it is checked if the absolute value of Γ is greater than π. If not, the process is repeated from step 300, now for the next ω of the set of ω values.

However, if |Γ|>π then the most recent solution, or possibly a number of recent solutions are discarded (i.e. removed from the solution set) so as to avoid the risk of false solutions, step 340, and the process is then finished, step 350.

Figure 4:
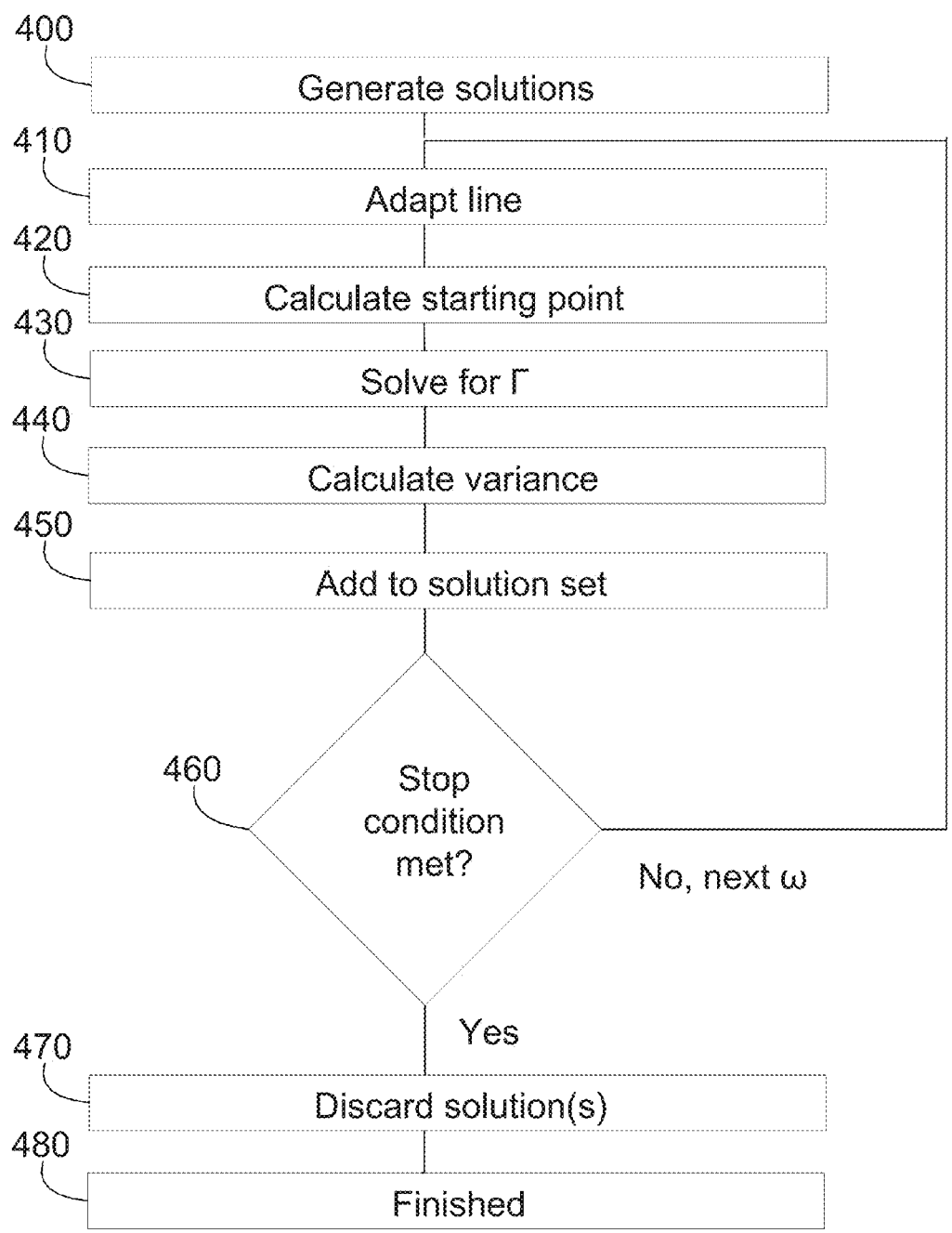
FIG. 4 shows a flow chart of a method wherein Γ is determined with the aid of an adapted line in the complex plane.

FIG. 4 shows how Γ may be determined for a frequency range where Γ is greater than π, i.e. above the range of FIG. 3, using the complex plane line adaption method.

In a step 400 a set of Γ solutions is generated. This is preferably done by the method of FIG. 3. The current ω is set to the ω which is next higher from the ω of a last Γ solution (i.e. solution for the highest w) in the solution set.

In a step 410 a line in the complex plane is adapted to the Γ solution set using least squares with perpendicular offsets.

In a step 420 a starting point for numerical solution is calculated as follows. The imaginary part of the starting point is set to the same value as the imaginary part of the last Γ solution. The real part of the starting point is set to the average of the real part of the last solution Γ and the real part of a point on the line which has the same imaginary part as the last Γ solution.

In a step 430 $Z_{in} \cdot j\omega \hat{C} = \Gamma \coth(\Gamma)$ is solved numerically for Γ using the calculated starting point.

In a step 440 the variance or standard deviation of the perpendicular offsets from the line is calculated for the solution set.

In a step 450 the solution is added to the solution set.

In a step 460 it is determined if a stop condition is met. The stop condition may be that the perpendicular offset of the added solution from the line exceeds the standard deviation calculated in step 440 times a predetermined value.

If the stop condition is not met the process repeats from step 110 with the next ω.

If the stop condition is met, one or more of the most recent solutions are discarded (i.e. removed from the solution set) to avoid the risk of false solutions, step 470 and the process is then finished, step 480.

Figure 5:
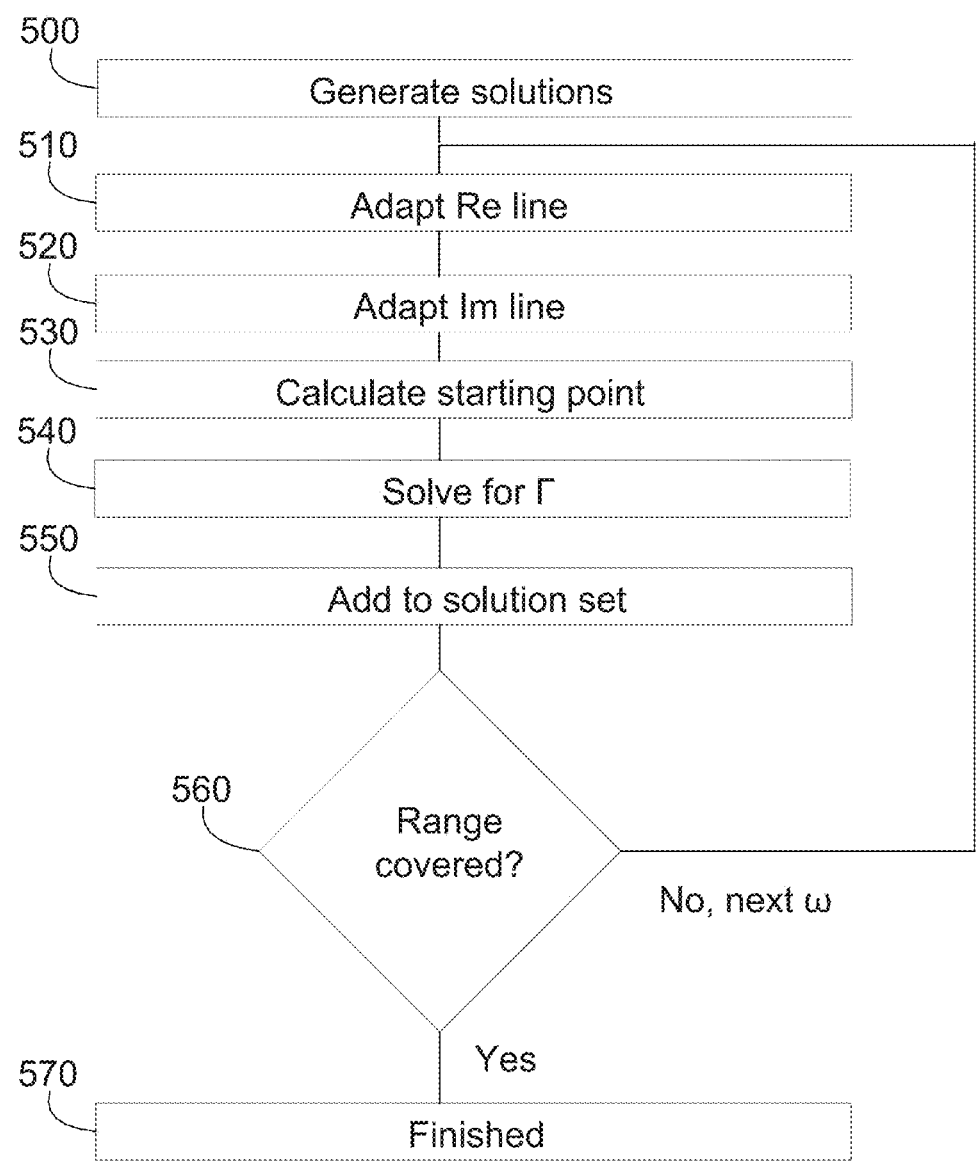
FIG. 5 shows a flow chart of a method wherein Γ is determined with the aid of two adapted lines in the frequency plane.

FIG. 5 shows how Γ may be determined using the frequency plane line adaption method for a frequency range which is higher than that which can be handled by the complex plane line adaption method.

In a step 500 a set of Γ solutions is generated. This is preferably done by the method of FIG. 4. The current ω is set to the ω which is next higher from the ω of a last Γ solution (i.e. solution for the highest ω) in the solution set.

In a step 510 a first line in the frequency plane is adapted to the real parts of the Γ solutions of the solution set.

In a step 520 a second line in the frequency plane is adapted to the imaginary parts of the Γ solutions of the solution set.

In a step 530 a starting point for numerical solution is calculated as follows: The real part is set to the ordinate value of the first line for the current ω. The imaginary part is set to the ordinate value of the second line for the current ω.

In a step 540 $Z_{in} \cdot j\omega \hat{C} = \Gamma \coth(\Gamma)$ is solved numerically for Γ using the calculated starting point.

In a step 550 the solution is added to the solution set.

In a step 560 it is checked if the desired ω range has been covered. If not, the process is repeated from step 510 for the next ω, else it is finished, step 570.

Hence, by the combination of the methods of FIGS. 2, 3, 4 and 5 as described above, Γ may be estimated for the entire DSL (e.g. VDSL2) frequency band.

Estimation of $\hat{R}$ and $\hat{L}$, Noise Reduction

From the set of Γ estimates, the equivalent line constants $\hat{R}$ and $\hat{L}$, can be extracted with good accuracy. For example, Γ can be squared to obtain $\Gamma^2$, and inductance and resistance estimates are generated by applying the equation $$\Gamma^2 = -\omega^2 \cdot \hat{L} \cdot \hat{C} + j\omega \cdot \hat{R} \cdot \hat{C}$$

where $\hat{L}$ can be determined by fitting the real part to a parabola, and $\hat{R}$ by fitting the imaginary part to a straight line, using weighted least-squares. That is, a straight line $g(\omega) = a\omega$ is least squares fitted to the value pairs of $\text{Im}(\Gamma^2(\omega))$, ω; and the line resistance estimate generated as $\hat{R} = a/\hat{C}$ and a quadratic function $h(\omega) = b\omega^2$ is least squares fitted to the value pairs of $\text{Re}(\Gamma^2(\omega))$, ω; and the line inductance estimate generated as $\hat{L} = -b/\hat{C}$. Standard least squares fitting is preferred.

In general, after values of $\Gamma^2$ has been generated for a number of frequencies, this set of values may undergo noise reduction by replacing it (using e.g. least squares adaption) with the function $\Gamma^2(\omega) = (b\omega^2 + ja\omega)$. Estimates of transmission properties are then made using the values of this function in the same way as they would have been made from values of $\Gamma^2$ that had not undergone noise reduction.

In situations when additive frequency-dependent noise is present, which is normally the case, the weighted least squares method is preferably used to improve the accuracy of parameter estimation. Preferably weights are chosen that are inversely proportional to the noise variance at the particular frequency.

Detecting Multi-Segment Lines

A plot of Γ estimates as a function of frequency may be used to detect if the line consists of a single segment of the same cable type, or if it consists of multiple segments of different cable types. The presence of ripple in Γ indicates that the line consists of more than one segment.

Figure 9:
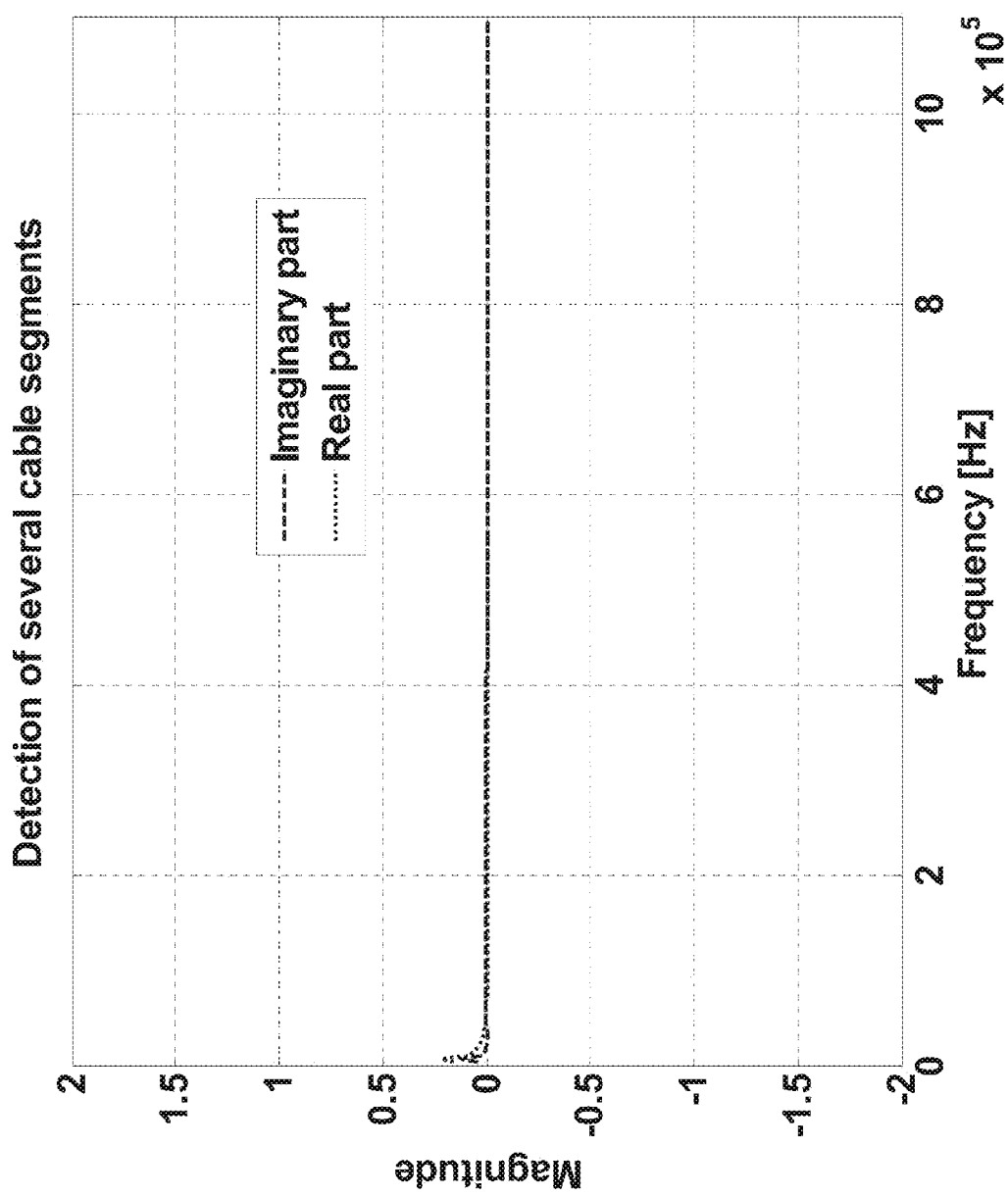
FIG. 9 shows a diagram of ripple in $\Gamma$ as a function of frequency for a single-segment line.
Figure 10:
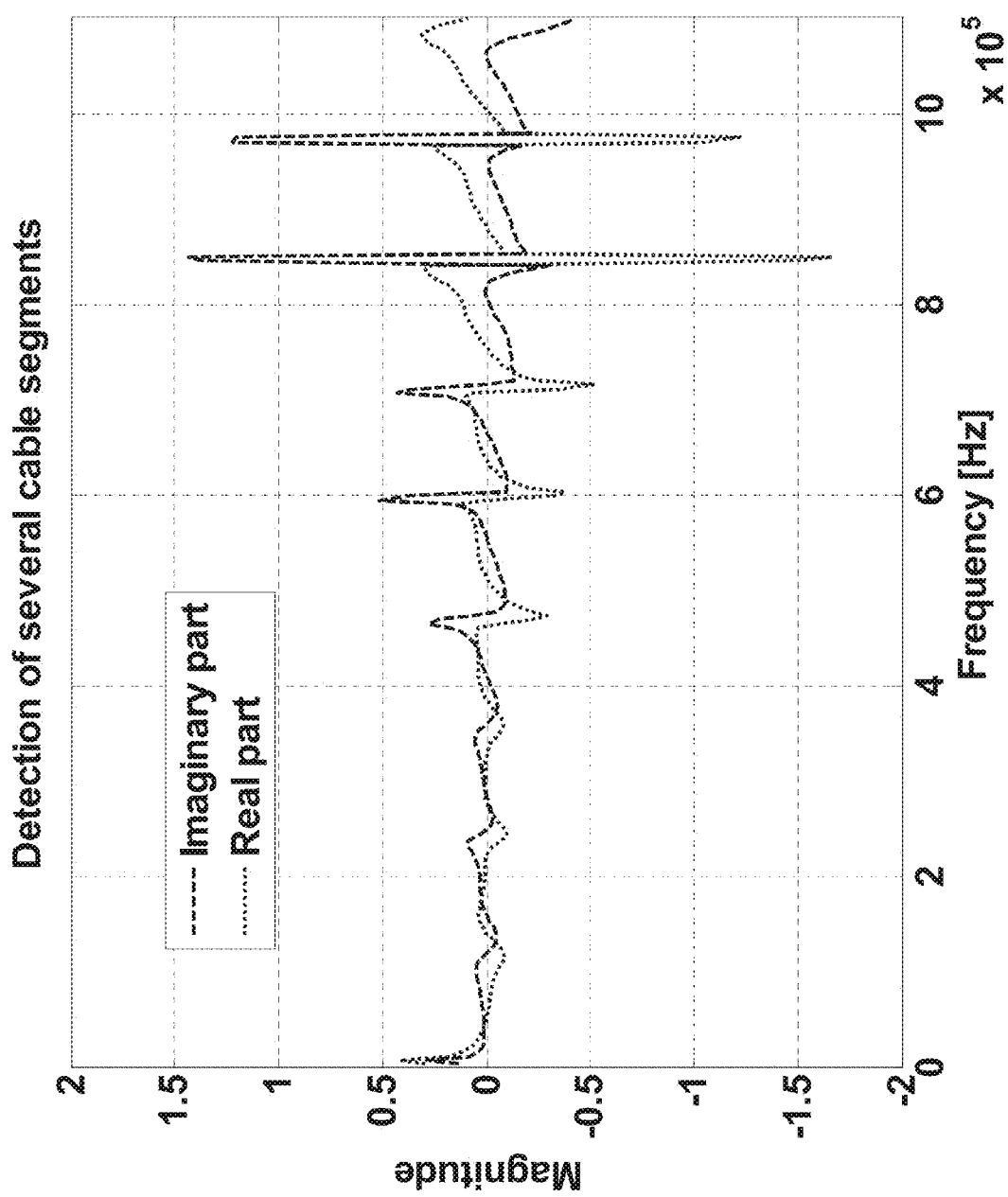
FIG. 10 shows a diagram of ripple in $\Gamma$ as a function of frequency for a two-segment line.

There are many possible ways of detecting ripple in Γ and the choice of method is not critical. For example, the real and imaginary parts of Γ as a function of frequency, Γ(ω) may be subjected to central derivative filtering, as shown in FIGS. 9 and 10. FIG. 9 shows the result for a single-segment line and FIG. 10 shows the result for a line consisting of two segments.

The vector formed by the set of filtered Γ values (either the real part or the imaginary part may be used) is scalar multiplied with itself to provide a sum of squares of deviation from zero. If this sum exceeds a predefined threshold, this may be taken as an indication that the line consists of multiple segments. As can be seen from the figures, the indication is quite clear and the choice of threshold value is not critical.

Another way of detecting the fluctuations in Γ is to adapt a line in the complex plane to Γ using least squares with perpendicular offsets, as in the complex plane line adaption method, and then analyze the perpendicular deviation of Γ from that line. As with the central derivative above, a sum of squares of deviations may be compared to a predefined threshold value to determine if the line consists of multiple segments or not.

This may be expressed as a rotation of $\Gamma$ in the complex plane, as follows.

$$Im(\Gamma) = a \cdot Re(\Gamma) + b$$

This is the adapted line.

$$\cos(\theta) = \sqrt{\frac{1}{1+a^2}}$$

$$\sin(\theta) = \sqrt{\frac{a^2}{1+a^2}}$$

$\theta$, the angle of slope of the line, is the angle by which to rotate $\Gamma$.

$$x = \text{real}(\Gamma_m) \cdot \cos(\theta) + imag(\Gamma_m) \cdot \sin(\theta) - \frac{b}{a}$$

x is the real part of the rotated $\Gamma$. It is not needed, as it represents a distance parallel to the line.

$$y = imag(\Gamma_m) \cdot \cos(\theta) + \text{real}(\Gamma_m) \cdot \sin(\theta) - \frac{b}{a}$$

y is the imaginary part of the rotated $\Gamma$. It represents the perpendicular distance to the line.

$$\Lambda = y \cdot y'$$

Generating a sum of squares of y values by scalar multiplication of the y vector.

Estimating DSL Transmission Capacity.

In DSL transmission, each sub-channel may be modeled according to Shannon's Channel Capacity theorem as a white Gaussian noise channel, the capacity of which is described by the following formula $$b_{DMT} = \sum_{k=1}^{N/2} b_{DMT}(k) = \sum_{k=1}^{N/2} \log_2 \left( 1 + \frac{E_k \cdot |H_k|^2}{(BW \cdot N_0) \cdot SNR_{gap}} \right)$$

where $SNR_{gap}$ relates bit error rate for a given modulation, and coding scheme (SNR is an abbreviation for Signal-to-Noise-Ratio), $E_k$ is transmitted energy at carrier k in watts, BW is the bandwidth of the channel in Hz, $N_0$ is one-sided white noise power spectral density.

$E_k$, $BW \cdot N_0$ and $SNR_{gap}$ are usually known or can be estimated with reasonable precision. The sole unknown quantity is $|H_k|^2$.

In practice, the line is normally nearly matched, i.e. $Z_T \approx Z_S \approx Z_0$ where $Z_T$ and $Z_S$ are terminating, respectively source impedance, $Z_0$ is the characteristic impedance.

Hence, the transfer function may with good accuracy be expressed as $$H(j\omega) = \frac{1}{\cosh(\Gamma_m) + \sinh(\Gamma_m)} = e^{-\Gamma_m}$$

The value of $|H_k|^2$ for can be then determined from the solution of Eq. 3 as $$|H_k|^2 = H_k \cdot H_k^* = e^{-2\hat{\alpha}_k}$$

where $\hat{\alpha}_k$ is estimate of the real part of $\Gamma_m(j\omega_k)$.

Thus, the $\Gamma$ estimates achieved by the methods described above may be used to provide an accurate and computationally efficient estimate of DSL capacity.

Results

Practical testing has shown that accuracy is excellent for transmission lines made up of only one cable type and good for lines made up of multiple segments of different cable types.

It can be noted that for a multi-segment line, it is strictly speaking not possible to define a $\Gamma$ which completely characterizes the line. For example, transmission properties may depend on direction, i.e. the line has different properties depending on from which end it is seen, as well as on line termination. The $\Gamma$ which is estimated here is for each frequency $\omega$ the $\Gamma$ of a hypothetical single-segment line which for that frequency behaves in the same way as the measured line, as seen from the end where $Z_{in}$ is measured. This distinction has limited practical importance, and the estimated $\Gamma$ can be used to estimate the line properties also for multi-segment lines.

The $\Gamma$ estimates are made for an open-ended line. When the line is terminated, the equivalent single-segment line is not exactly the same as the single-segment line that is equivalent to the unterminated multi-segment line.

Hence, if the transfer function of the multi-segment line is measured by double-ended measurement (and thus the line is properly terminated at both ends) and $\Gamma$ values are calculated from the transfer function as if the line had been single-segment, this will not match exactly to the $\Gamma$ estimates made by the methods of the invention. However, the difference is quite small, and so the $\Gamma$ estimates are still highly useful for practical purposes.

Figure 11:
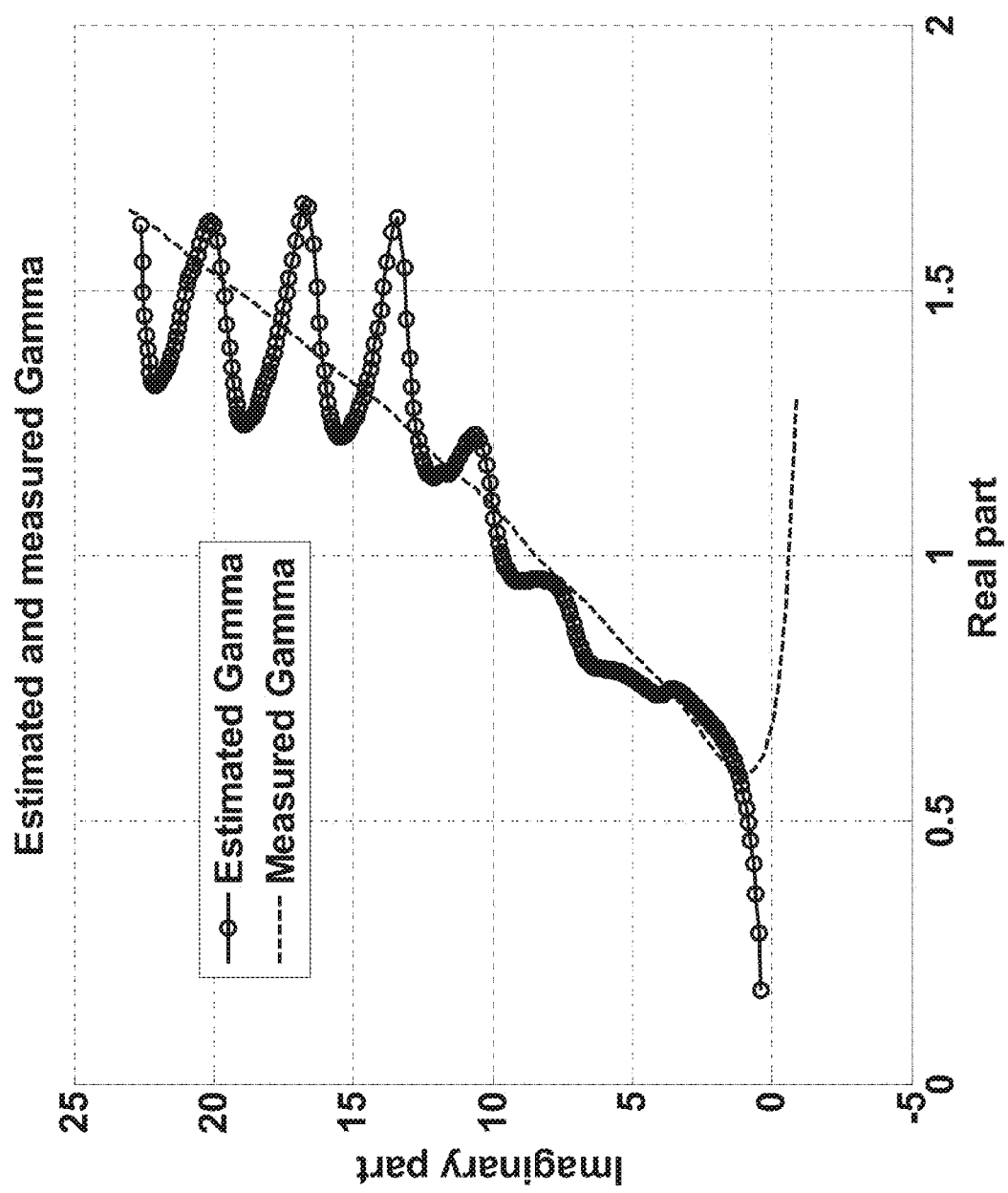
FIG. 11 shows plots in the complex plane of $\Gamma$ as estimated according to the invention and $\Gamma$ as determined by double-ended measurement, for a multi-segment line.
Figure 12:
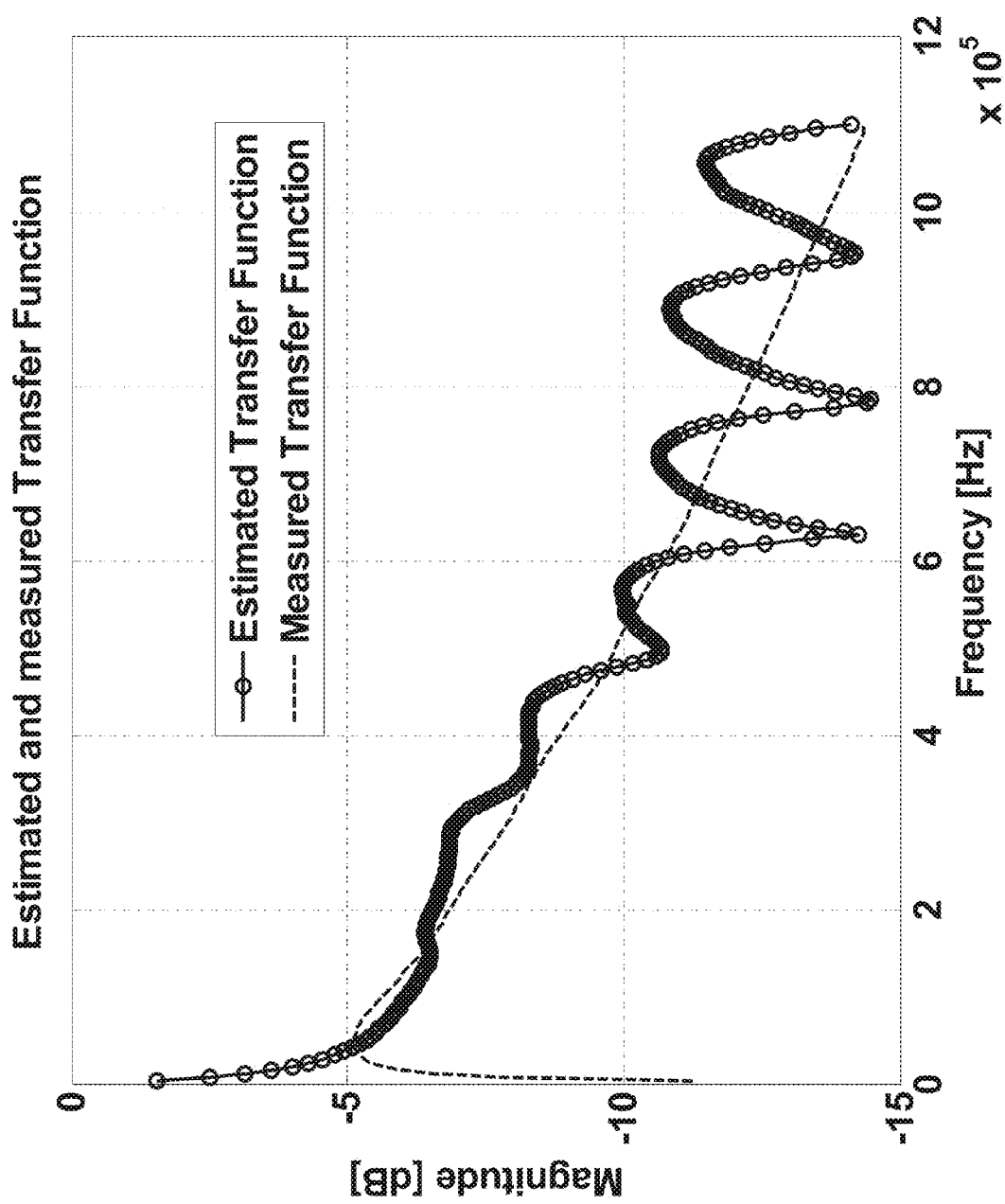
FIG. 12 shows a diagram of line transfer function as a function of frequency (i.e. in the frequency plane) as calculated from $\Gamma$ estimated according to the invention and as determined by double-ended measurement, for a multi-segment line.
Figure 3:
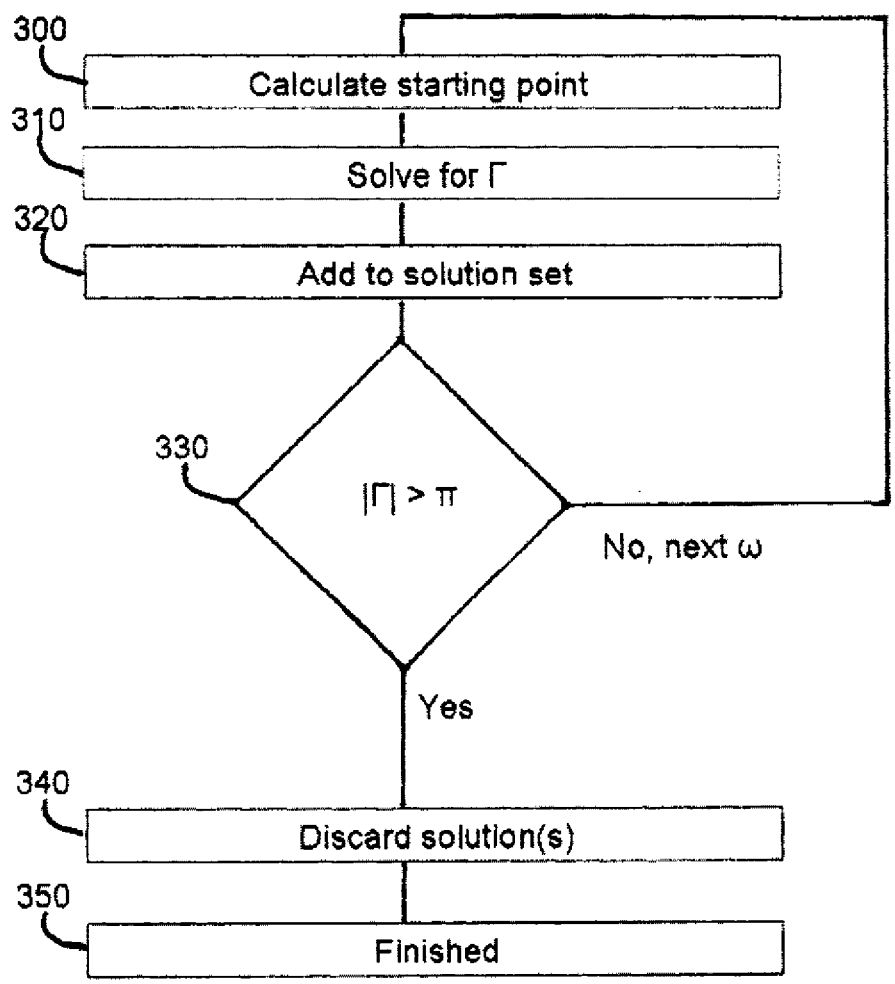
Figure 5:
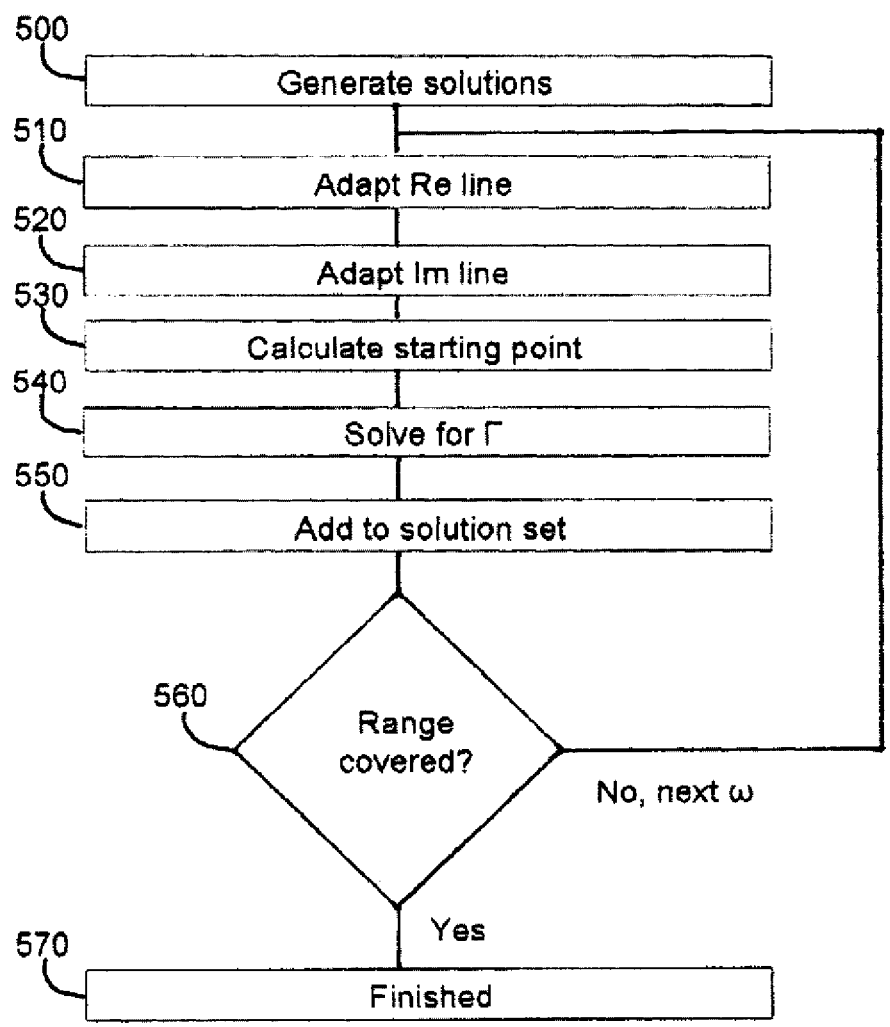

The differences are illustrated in FIG. 11 (estimated $\Gamma$ and $\Gamma$ calculated from double-ended transfer function measurements displayed in the complex plane) and FIG. 12 (transfer function calculated from estimated $\Gamma$ an transfer function obtained from double-ended measurements displayed in the frequency plane). The deviation for low values of the real part is caused by a high pass filter in the transfer function measurement setup.

Example of Physical Setting

As shown in FIG. 1, telecommunication transmission lines 60 typically terminate in one end at a customer premises site 61 and in the other end at a central office setting 130. Here, the lines are typically connected to line boards 100. The line boards 100 are typically controlled by a processor 110 of a telecommunication exchange. It is of great interest to be able to measure properties of the lines 60 from the central office setting 130.

Hence, this is a setting in which the methods according to the present invention may advantageously be used. The calculations to generate estimates according to the present invention may be carried out in the processor 110, or in a separate computer such as a workstation 120. The results may for example be presented on screen, sent over a network, stored or printed.

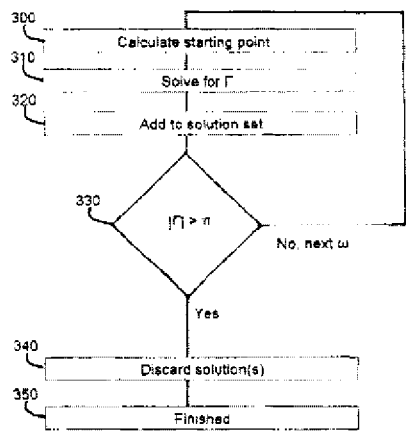

The invention claimed is:

1. A method, in a processor, for generating an estimate of a transmission property of a telecommunications transmission line, the method comprising:
obtaining estimates of the complex line impedance, $Z_{in}$, for at least a first set of angular frequencies $\Omega$;
obtaining an estimate of the line capacitance, $\hat{C}$;

generating a Γ solution set by obtaining an estimate of Γ for each member of a subset of the first set of angular frequencies Ω;

executing, a plurality of times, the steps of:

adapting at least one curve to the Γ solution set;

generating a further solution for Γ by solving numerically for Γ the relationship $Z_{in}\cdot j\Omega \hat{C}=\Gamma\coth(\Gamma)$ for a further angular frequency from the first set, using a starting point selected in dependence of said at least one curve and in dependence of a first member of the Γ solution set for which the corresponding angular frequency is close to the further angular frequency;

adding the further solution for Γ to the Γ solution set;

until the solution set comprises estimates of Γ for all the members of the first set of angular frequencies Ω; and generating an estimate of the transmission property in dependence of all or part of the Γ solution set.

2. The method of claim 1, wherein the at least one curve is a line in the complex plane and the line is adapted to the Γ solution set by least squares fitting using perpendicular offsets.

3. The method of claim 2, wherein the starting point is selected as a point which lies on a line segment between the first member of the Γ solution set and a point on the line in the complex plane.

4. The method of claim 3, wherein the starting point has the same imaginary part as the first member of the Γ solution set, and a real part which is the average of the real part of the first member and the real part of a point on the line which has the same imaginary part as the first member.

5. The method of claim 1, wherein in the frequency plane a first line is adapted to the real part of Γ and a second line is adapted to the imaginary part of Γ.

6. The method of claim 5, wherein the starting point in the complex plane is selected such that the real part and the imaginary part are the values of the first and second line respectively for the further angular frequency.

7. The method of claim 1, wherein for a first frequency band, Γ is determined numerically, using a starting point which is determined analytically.

8. The method of claim 7, wherein for a second frequency band, higher than the first, Γ is determined by adapting a line in the complex plane to the Γ solution set by least squares fitting using perpendicular offsets.

9. The method of claim 8, wherein for the first frequency band Γ is less than π.

10. The method of claim 8, wherein for a third frequency band, higher than the second, Γ is determined by adapting a first line in the frequency plane to the real part of Γ and adapting a second line in the frequency plane to the imaginary part of Γ.

11. The method of claim 10, wherein for the first frequency band Γ is less than π.

12. The method of claim 10, wherein when Γ is determined is determined by adapting a line in the complex plane to the Γ solution set by least squares fitting using perpendicular offsets, a running variance of the perpendicular distance from the solution point to the line in the complex plane is calculated as the frequency is increased, and when the variance exceeds a predefined threshold, or the square of an estimate exceeds the product of the variance and a predetermined value, Γ is instead determined by adapting a first line in the frequency plane to the real part of Γ and adapting a second line in the frequency plane to the imaginary part of Γ.

13. The method of claim 1, wherein an estimate of an achievable DSL capacity is generated by determining the square of the absolute value of the line transfer function as $e^{2Re(\Gamma)}$ and applying Shannon's channel capacity theorem, where Γ is an estimate of any preceding claim for a angular frequency for which the capacity estimate is made.

14. The method of claim 1, wherein the transmission property to be estimated is the property of whether the line consists of multiple segments of different types of cables or not, and wherein the estimate of the property is made in dependence of the magnitude by which the Γ estimate fluctuates with frequency.

* * * * *

UNITED STATES PATENT AND TRADEMARK OFFICE
CERTIFICATE OF CORRECTION

PATENT NO. : 8,781,078 B2
APPLICATION NO. : 13/394392
DATED : July 15, 2014
INVENTOR(S) : Fertner et al.

It is certified that error appears in the above-identified patent and that said Letters Patent is hereby corrected as shown below:

Delete the Title Page and substitute therefore the attached Title Page consisting of the corrected illustrative figure.

On the Title Page, in Item (57), under "ABSTRACT", in Column 2, Line 3, delete "$Z_{in}\cdot j\omega\hat{}C=\Gamma coth(\Gamma)$." and insert -- $Z_{in}\cdot j\omega\hat{C}=\Gamma coth(\Gamma)$. --, therefor.

In the Drawings

Delete Drawing Sheet 3 of 12 and 5 of 12 and substitute therefore with the attached Drawing Sheet 3 of 12 and Drawing Sheet 5 of 12.

In the Specification

In Column 3, Line 3, delete "π (|Γ|=π)" and insert -- π (|Γ|=π), --, therefor.

In Column 7, Line 61, delete "$D_k$," and insert -- $D_k$ --, therefor.

In Column 11, Line 57, delete "$Z_r \approx Z_S \approx Z_O$" and insert -- $Z_T \approx Z_S \approx Z_O$ --, therefor.

In the Claims

In Column 12, Line 66, in Claim 1, delete "Ω;" and insert -- ω; --, therefor.

In Column 13, Line 3, in Claim 1, delete "Ω;" and insert -- ω; --, therefor.

Signed and Sealed this
Fifth Day of May, 2015

Michelle K. Lee
*Director of the United States Patent and Trademark Office*

In Column 13, Line 7, in Claim 1, delete "$Z_{in} \cdot j\Omega\hat{C} = \Gamma\coth(\Gamma)$" and insert -- $Z_{in} \cdot j\omega\hat{C} = \Gamma\coth(\Gamma)$ --, therefor.

In Column 13, Line 15, in Claim 1, delete "Ω;" and insert -- ω; --, therefor.

In Column 14, Lines 16-17, in Claim 12, delete "is determined is determined" and insert -- is determined --, therefor.

In Column 14, Line 30, in Claim 13, delete "$e^{2Re(r)}$" and insert -- $e^{-2Re(r)}$ --, therefor.

(12) United States Patent
Fertner et al.

(10) Patent No.: US 8,781,078 B2
(45) Date of Patent: Jul. 15, 2014

(54) METHOD FOR ESTIMATING TRANSMISSION PROPERTIES OF A TELECOMMUNICATIONS TRANSMISSION LINE

(75) Inventors: Antoni Fertner, Stockholm (SE); Per Ola Börjesson, Lund (SE); Daniel Cederholm, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 65 days.

(21) Appl. No.: 13/394,392

(22) PCT Filed: Sep. 11, 2009

(86) PCT No.: PCT/SE2009/051016
§ 371 (c)(1),
(2), (4) Date: Mar. 6, 2012

(87) PCT Pub. No.: WO2011/031199
PCT Pub. Date: Mar. 17, 2011

(65) Prior Publication Data
US 2012/0163559 A1   Jun. 28, 2012

(51) Int. Cl.
*H04M 1/24* (2006.01)

(52) U.S. Cl.
USPC ............ 379/24; 379/243; 379/394; 379/414

(58) Field of Classification Search
USPC ......... 379/24, 30, 1.01, 1.04, 23, 27.01, 394, 379/398, 243, 414
See application file for complete search history.

(56) References Cited

FOREIGN PATENT DOCUMENTS

| FR | 2586818 A1 | 3/1987 |
| WO | 2007050001 A1 | 5/2007 |
| WO | 2009131501 A1 | 10/2009 |

OTHER PUBLICATIONS

Brusset, H et al. "On the Convergence of Standard and Damped Least Squares Method." Abstract Only. Journal of Computational Physics, vol. 22, No. 4, Dec. 1976.
Farhang, J. "Process Simulation using Continuation Method in Complex Domain." Computers & Chemical Engineering, vol. 22, Suppl. 1, Mar. 15, 1998.
Hasar, U. C. "A Microwave Method for Noniterative Constitutive Parameters Determination of Thin Low-Loss or Lossy Materials." IEEE Transactions on Microwave Theory and Techniques, vol. 57, No. 6, Jun. 2009.

(Continued)

*Primary Examiner* — Duc Nguyen
*Assistant Examiner* — Yosef K Laekemariam
(74) *Attorney, Agent, or Firm* — Murphy, Bilak & Homiller, PLLC

(57) ABSTRACT

Transmission properties of a telecommunications transmission line may be estimated with improved accuracy by numerical solution for $\Gamma$ of $Z_{in}$·j$\omega$·C·$\Gamma$coth($\Gamma$). At least one curve is adapted to $\Gamma$ solutions already obtained and a starting point for numerical solution is selected in dependence of the at least one curve and in dependence of an already obtained solution close in frequency. In a first frequency range, starting points for numerical solution may be calculated from a biquadratic equation. In a second frequency range, a line in the complex plane may be adapted to solutions already obtained and new starting points selected in dependence of the line and in dependence of the previous solution. In a third frequency range, two lines in the frequency plane may be adapted to solutions already obtained and new starting points selected in dependence of the lines.

14 Claims, 12 Drawing Sheets